March 26, 1968 — J. S. ECKERT — 3,374,988
LIQUID-LIQUID CONTACTOR
Filed May 7, 1965 — 2 Sheets-Sheet 1
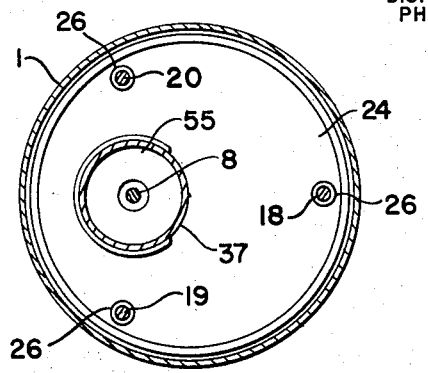
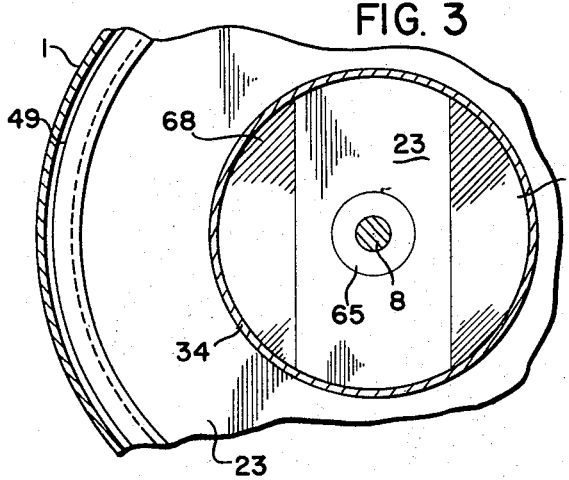
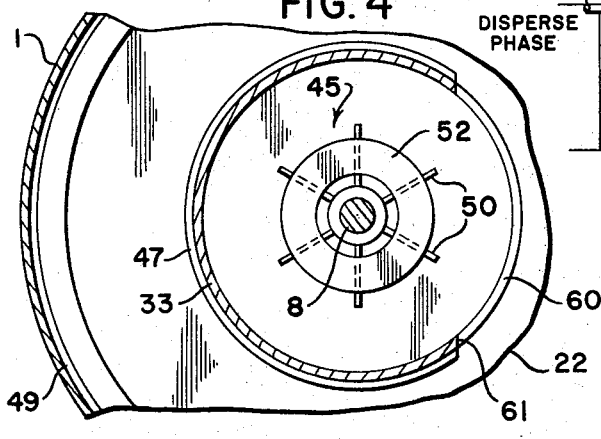
INVENTOR.
JOHN S. ECKERT
ATTORNEY

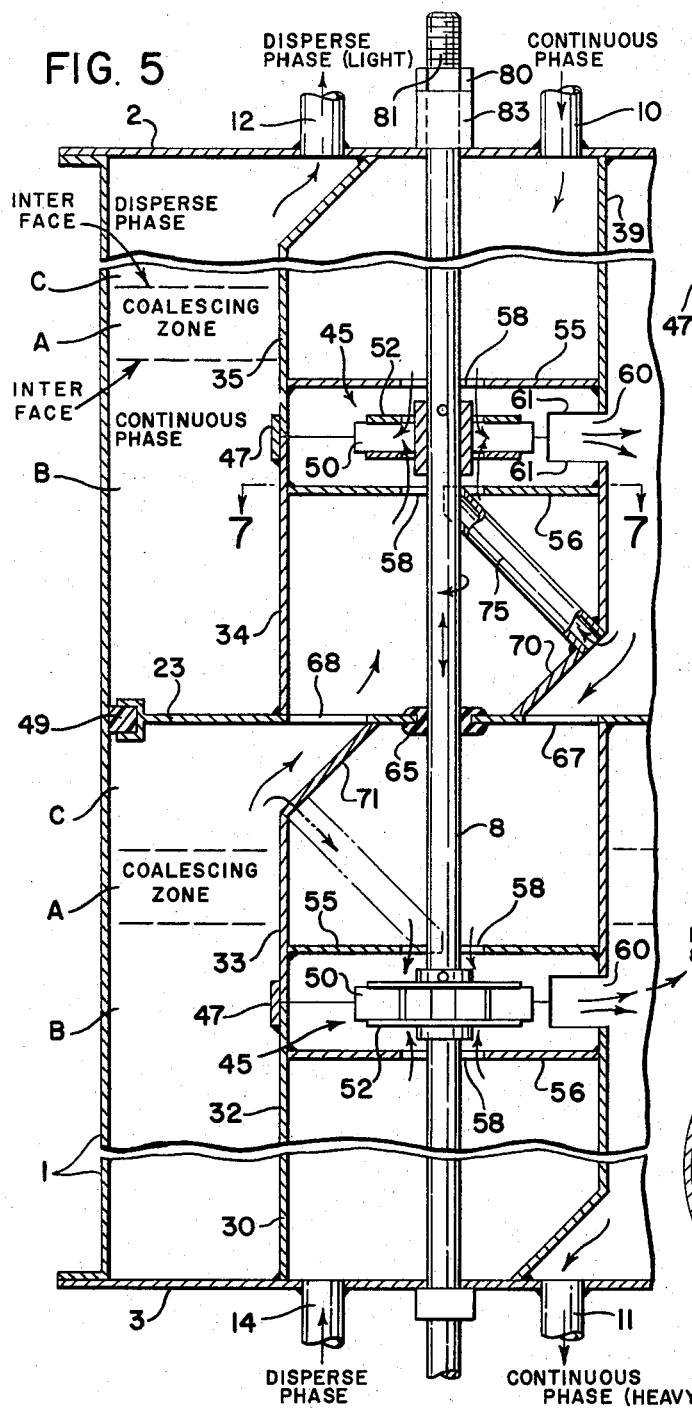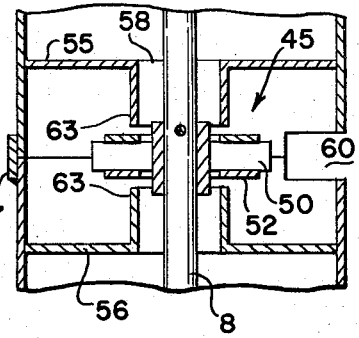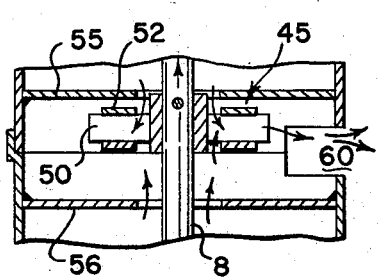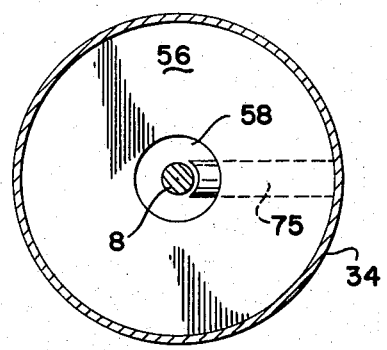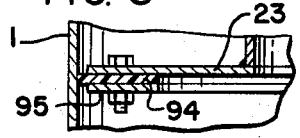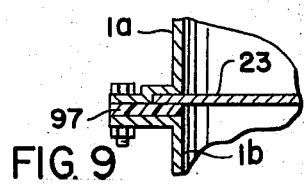

United States Patent Office 3,374,988
Patented Mar. 26, 1968

3,374,988
LIQUID-LIQUID CONTACTOR
John S. Eckert, Silver Lake, Ohio, assignor, by mesne assignments, to U.S. Stoneware Inc., a corporation of Massachusetts
Filed May 7, 1965, Ser. No. 454,075
8 Claims. (Cl. 259—8)

This invention relates to a liquid-liquid contactor and the method of assembling the same.

The contactor is used for bringing two immiscible liquids into large-surface contact with one another by repeatedly dispersing one liquid in the other and allowing the dispersed phase to coalesce between each two such dispersions. Thereby a component portion of one liquid is extracted into another liquid, as for example, in washing one liquid with the other, etc. The two liquids are of sufficiently different densities to permit separation of the two phases from a dispersion thereof, on standing.

The contactor includes an inner shell or mixing compartment and an outer shell or settler. The liquids are mixed within the inner shell. In the space between the shells the two phases separate from a dispersion of the two, and the disperse phase coalesces.

The contactor is assembled from a top, a bottom and a middle portion. The middle portion is composed of preassembled sections and an agitator shaft extends through these sections. A separate shrouded agitator similar to the impeller of a pump is fastened to the shaft between each two sections, and also between the top section and the top of the contactor, and also between the bottom section and the bottom of the contactor. A partition is positioned between the top and bottom of each section with its periphery sealed to the exterior shell; and one tube is fastened to the top of each partition and another tube is fastened to the bottom of it. These tubes form the inner shell. Suitable openings in the partitions and tubes provide a supply of each of the two liquid phases to the several agitators from within the inner shell for separation of the phases in each section outside of the inner shell.

Optionally, a recycling pipe is provided within the tube of at least one section, and possibly within each tube of each section, for recycling the phases within the one or more stages, in order to redisperse the phases and allow them to recontact before passing from one stage of the operation to the next stage.

The position of the agitator shaft within the shell is preferably adjustable to vary proportions of the two phases dispersed by the agitators.

The invention includes the new agitator arrangement.

The invention is further described in connection with the accompanying drawings, in which—

FIGURE 1 is a vertical section through a liquid-liquid contactor;

FIGURES 2, 3 and 4 are horizontal sections on the lines 2—2, 3—3 and 4—4 of FIGURE 1;

FIGURE 5 is an enlarged vertical section with portions broken away;

FIGURE 6 is an enlarged section of the agitator shown in other figures;

FIGUE 7 is a section on the line 7—7 of FIGURE 5;

FIGURES 8 and 9 are alternative structures for sealing partitions to the outer shell of the contactor; and FIGURE 10 is an enlarged section of an agitator chamber of modified construction.

The contactor comprises the outer shell 1 with the cover 2 and base 3, the base being mounted on a cylindrical or other support 4 which encloses a motor 5 with a belt 6 or other suitable means connected to the drive shaft 8. If a belt is used, the belt pulley on the bottom of shaft 8 is adapted to shift on the shaft if the shaft is shifted vertically, as will be explained.

The heavier liquid, which for illustration is considered to be the continuous phase, enters the contactor through the pipe 10 and leaves through the exit pipe 11. The disperse phase enters the contactor through the pipe 14 and leaves through the pipe 12. Within the contactor are several series of spacers 18, 19 and 20 (FIGURE 2) which in FIGURE 1 are shown as separating the several partitions 22, 23, 24 and 25, each of the spacers resting in one of the several cups 26 fastened to the base 3 and the several partitions 22, 23 and 24. These spacers give structural strength to the stages and make it possible for the partitions to be maintained in a horizontal position.

Inside of the outer shell or settler 1 is the inner shell or mixing chamber which is formed of tubes or the like. 30, 31, 32, 33, 34, 35, 36, 37, 38 and 39. One of these tubes is attached to the top, and another to the bottom of each of the partitions thus forming the bottom of one stage and the top of another. Another tube is fastened to the bottom of the cover 2 and another to the top of the base 3.

To facilitate explanation, the contactor is considered as being made up of the top which includes the cover 2 and tube 39, the bottom which includes the base 3 and the tube 30, and an intermediate portion which includes the partitions 22, 23, 24 and 25 with two tubes welded to each. Each partition with the tubes fastened to its top and bottom, is considered to be a section, and between adjacent sections is an agitator 45. An agitator 45 is likewise provided between the tubes 30 and 31, and between the tubes 38 and 39. Each of these agitators not only mixes liquid drawn from the upper and lower stages of the mixing chamber in which it is located, but also pumps the resulting dispersion from the miixng chamber into the outer shell or settler. FIGURE 5 shows the partition 23, and the partitions 22, 24 and 25 are considered located within the portions of the contactor which have been broken away. Any desired number of mixing chambers and partitions can be used.

It is to be noted that around the top rim of the upper tube of each lower section is a short length of alignment metal 47 of larger diameter into which the upper section fits. This is a loose alignment. Alternatively, the short length of alignment metal 47 may be attached around the bottom rim of each upper section to be slipped over the top of a lower section. This permits the sections to be assembled simply by resting one section on the other where it is held in place by the short length of alignment metal 47. As shown in FIGURE 5, the periphery of each partition is bifurcated and a resilient seal 49 of suitable elastomeric material forms a liquid-tight seal between the periphery of each partition and the outer shell. Thus, each of the sections is slipped down into place inside of the outer shell in a preassembled form, and rests there without being fastened, so that the contactor is readily installed. and may be readily dismantled when the occasion occurs.

After one section has been put in place and before the next section is put in place, an agitator 45 is fastened to the agitator shaft 8. As best shown in FIGURE 4, each of these agitators includes several radial blades 50 and an upper and lower annular shroud 52 fastened to the blades. As the agitator is rotated by the shaft, both phases of the liquid are drawn into the opening within the shrouds, from both above the agitator and below it, and the one phase is here dispersed into the other phase and the resulting dispersion is forced out laterally in a horizontal plane by centrifugal pumping action of the agitator. The dispersion circles around in this mixing chamber on its way to the outlet 60, and the liquid thrown out by the agitator causes violent agitation of this circling liquid already in the chamber.

Immediately above each agitator is a diaphragm 55 fastened to the tube above the agitator, and below the agitator is a diaphragm 56 fastened into the tube which is located immediately below the agitator. These diaphragms are located near the rims of the respective tubes and form a chamber in which the agitator is located. There is an opening 58 in each diaphragm through which the agitator shaft passes, and the opening is large enough to permit the flow of a substantial amount of liquid through it. In the general horizontal plane of each agitator there is an opening 60 in the inner shell. This is advantageously formed by cutting the edge of each tube away along the line 61.

In order to prevent liquid flowing through openings 58 from becoming intermixed with liquid coming from the agitator before this liquid flowing through the openings enters the agitator 45, short tubes 63 (FIGURE 10) may be fastened to the borders of these openings to direct the liquid into the openings formed by shrouds 52 of the agitator. By thus keeping the incoming liquid separate from that thrown out by the agitator, it is obviously possible to locate the diaphragms farther from the agitator and thus increase the size of the mixing chamber which is between the diaphragms. Such increase in the volume of the mixing chamber provides a longer dwell of the liquids in this chamber where intense agitation is maintained and thus increases the efficiency at each stage of the contactor operation.

The agitator shaft is held by a liquid-tight pilot bearing 65 in each partition. Each partition also comprises two openings 67 and 68 which are within the area defined by the tubes, and these are preferably located on opposite sides of the agitator shaft. Trap doors 70 and 71 formed from the partition plate extend to the inner edges of the respective openings 67, 68; the trap door 70 slanting upwardly and the trap door 71 slanting downwardly. The trap door 70 which is bent upwardly from the partition is welded to the edge of the tube 34 which is cut away so that liquid in the settler section surrounding the inner shell flows through the opening 67 into the tube 33. Conversely, the trap door 71 which is bent down from the partition is welded to a cut-away portion of the tube 33, so that liquid from the settler section surrounding the inner shell passes through the opening 68 to the interior of the tube 34.

The recycling pipe 75 is optical. There may be such a pipe between each trap door and the opening 58 in the diaphragm nearest to it. There may be a valve in this recycling pipe which is open part or all of the way, at times, to permit a smaller or larger amount of the liquid within any one or more stages to be recycled before passing to the next stage in the operation. Furthermore, the agitator shaft 8 may be raised or lowered to bring the agitator nearer the diaphragm 55 or the diaphragm 56 to vary the proportion of the two liquids introduced into the agitator between the diaphragms to be there dispersed. Thus, the proportion of the two liquids dispersed can be varied, as desired. The locknut arrangement 80 at the top of the agitator shaft rests on the short length 83 of pipe which surrounds the shaft. By loosening the locknut, shifting the shaft up or down, and then tightening the locknut, the position of all of the agitators with respect to the diaphragm openings above and below them is varied, and thus the proportions of the two phases entering each dispersion may be adjusted. FIGURE 6, for instance, shows an agitator raised in the space between the two diaphragms 55 and 56. In this position a larger amount of the liquid from the upper tube enters the agitator than liquid from the lower tube. Conversely, if the agitator shaft 8 were lowered, more of the liquid from the lower tube would enter the agitator.

FIGURES 8 and 9 show different means of providing seals between the partitions and the outer shell. FIGURE 8 shows a gasket 94 held between the partition 23 and the ring 95, the gasket being in sealing contact with the shell 1. Supposing that the outer shell is built up of sections, in FIGURE 9 the partition 23 together with the gasket 97 is held between the shell sections 1a and 1b. Any suitable gasketing means may be employed.

In operating the contactor, and supposing that the continuous phase is a heavier phase such as water, and the disperse phase is a lighter phase such as oil, the continuous phase is introduced through the conduit 10 and, referring to FIGURE 1, enters the chamber 39. It passes down through the various stages until it reaches the tube or chamber 35 shown in FIGURE 5. The disperse phase entering through the conduit 14 passes up through the various stages until it reaches the tube or chamber 34. The disperse phase in the chamber 34 passes up through the opening 58 in the diaphragm 56 to the agitator 45 where it is mixed with continuous aqueous phase which passes down from the chamber 35 through the opening 58 in the diaphragm 55. The two phases are thoroughly mixed by the agitator action and the resulting dispersion is driven out centrifugally through the opening 60 into the space between the inner and outer shells. Here the liquid settles. The dispersion of the two phases rises to the coalescing zone A (FIGURE 5). The heavier aqueous phase settles to the zone B and the oil after coalescence rises into the zone C.

As seen in FIGURE 1, oil from the zone C which surrounds the tube 35, passes up through the contactor through the partition 24 to an upper stage where it is mixed with water, and further extracted from the one phase into the other phase takes place.

The aqueous phase which collects in zone B, outside of tubes 34 and 35, passes down through the opening 67 (FIGURE 5) in the partition 23 and enters the tube 33. This aqueous phase is then fed down through the opening 58 in the diaphragm 55 in this tube, and this is mixed with oil which rises from the tube 32 through the opening 58 in the diaphragm 56, and the two phases are mixed in the agitator and propelled outwardly through the opening 60 into the space between the inner and outer shells. Here the liquid settles and a new zone A is maintained in which the oil particles are coalesced, and the coalesced oil rises to form a different oil zone C. The water settles into a different zone B. Thus the two phases are mixed repeatedly in their countercurrent passage through the contactor, and after each mixing they separate and the oil phase is mixed with fresher water and the water phase which has been used for extraction is mixed with fresher oil. There is thus countercurrent flow of the two phases through the contactor with repeated dispersions and separations.

By using a recycling pipe 75 attached to the trap door 70 (FIGURE 5), some of the water which has been collected above the partition 23 is recycled and again dispersed with oil before it passes through the opening 67 to the next lower stage. Similarly, referring to the recycling pipe in tube 33 (FIGURE 5) some of the oil which has risen from the coalescing zone C is drawn down through the recycling pipe to the agitator between the tubes 32 and 33, and is again dispersed with water coming down through the tube 33, and is again mixed in this agitator with oil that rises from the tube 32. By such use of one or more recycling pipes some of the disperse phase and/or continuous phase may be recycled in one or more stages before passing on to a subsequent stage.

The equipment may be produced in various sizes. The outer shell may, for example, be 4 inches to 8 feet in diameter and the inner shell composed of tubes may be 1 inch to 2 feet in diameter. The distance between the partitions may vary from 2 inches to 1 foot, for example, and the speed of the agitator may be varied, for example, from 100 to 600 r.p.m. The number of stages may be varied from two to six or eight or ten or more. Thus the equipment may be designed to handle from 1 to 600 gallons of each phase per hour, and the amount of the disperse phase handled in any hour may be substantially more or less than the amount of the continuous phase handled in the same period of time. The foregoing specifications in this paragraph are suggestive and are not to be construed in a restrictive sense.

The invention is covered in the claims which follow.

What I claim is:

1. A liquid-liquid contactor which comprises (1) an outer shell and (2) an inner shell with a top, bottom and middle portion, with said middle portion divided into unitary sections capable of being inserted into and removed successively intact from the outer shell, an agitator shaft extending through said middle portion, each section comprising a partition with a portion thereof within the inner shell which divides the section of the inner shell into upper and lower portions, the perimeter of the partition being sealed to the outer shell, means which includes one opening in the partition connecting the space within the portion of the inner shell above the partition with the space below the partition which is between the inner and outer shells, and means which includes another opening in said partition connecting the space within the portion of the inner shell below the partition with the space above the partition between the inner and outer shells, a diaphragm in each portion of the inner shell above and below the partition in each section, with an opening in each diaphragm occupied only in part by the agitator shaft, an agitator fastened to the agitator shaft at approximately the junction line between each two sections and below the lower diaphragm of the upper of said two sections and above the upper diaphragm of the lower of these sections, with an opening through the inner shell in substantially the plane of the agitator.

2. The contactor of claim 1 in which the agitators and the openings in the inner shell through which liquid flows from the respective agitators are vertically adjustable with respect to one another to vary the portions of the liquid flowing through each agitator between that which comes from above that agitator and that which comes from below it.

3. The contactor of claim 1 in which the agitator is a centrifugal agitator with vertical radial blades and two annular shrouds mounted respectively on the tops and bottoms of the blades which provide openings to the interior of the agitator, and means surrounding the openings in the diaphragms which convey liquid from these respective openings to said openings to the interior of the agitator.

4. A liquid-liquid contactor comprising an outer shell and within it a top, a bottom and a middle portion, a vertical agitator shaft with its top above the top of the middle portion and its bottom below the middle portion, with means for revolving said shaft, the middle portion being composed of a plurality of unitary sections held together, one above the other, by gravity only each section comprising (a) a horizontal partition the periphery of which is in liquid-tight contact with the outer shell, and said partition having a liquid-tight seal surrounding the vertical shaft, (b) two pieces of tube of substantially the same diameter sealed to the partition concentrically about the shaft, the upper tube being above the partition and the lower tube being below it, said tubes mating with tubes comprised by the sections immediately above and below said section, two openings in the partition adjacent the tube walls, with a portion of the bottom edge of the upper tube removed at one opening and a trap door slanting up from the partition at the edge of said opening with the perimeter of the trap door that is away from the partition fastened to the tube edge formed by said removal whereby there is formed an opening from the space above the partition surrounding the upper tube to the interior of the lower tube, and a portion of the upper edge of the lower tube removed at the other opening and a trap door slanting downwardly from the partition at the edge of this opening with the perimeter of the trap door that is away from the partition fastened to the tube edge formed by said removal whereby there is formed an opening from the space below the partition surrounding the lower tube to the interior of the upper tube, and (c) a diaphragm across each tube near the edge thereof which is a substantial distance away from the partition with an opening in each diaphragm about the agitator shaft which is sufficiently larger than the shaft to permit the passage of a substantial amount of liquid therethrough, an agitator attached to the shaft between each two sections with the lower diaphragm of the upper of said two sections above it and the upper diaphragm of the lower of said two sections below it, and in the horizontal plane of each agitator an opening at the mating edges of the tubes in the sections above and below each agitator, respectively, to permit liquid flowing outward from each agitator to pass from within the tubes to the space within the shell outside of the tubes which space is bounded by the partitions which are comprised by said two sections.

5. The contactor of claim 4, the top of which is covered and includes a tube fastened to the cover thereof the lower edge of which tube mates with the upper edge of the upper tube of the top section of said middle portion, a diaphragm across said tube near the bottom edge thereof which diaphragm is a substantial distance away from the cover of the contactor, an opening in said diaphragm about the agitator shaft which passes therethrough and which opening is sufficiently larger than the shaft to permit the passage of a substantial amount of liquid therethrough, an agitator attached to the shaft between said diaphragm and the top diaphragm of said top section, in the horizontal plane of the agitator an opening at the mating edges of said tube in the cover and the upper tube of said top section to permit liquid flowing outward from the agitator to pass from within the tubes to that area within the shell which surrounds the tubes, with a liquid inlet and outlet for the contactor through the cover, one of which connects with the interior of the tube fastened to the cover and the other of which connects with the space within the shell surrounding said tube.

6. The contactor of claim 4, the bottom of which is covered by a cover and includes a tube fastened to said bottom cover, the top edge of which tube mates with the bottom edge of the bottom tube of the bottom section of the middle portion, a diaphragm across said tube fastened to said bottom cover near the top edge thereof which diaphragm is a substantial distance away from the base of the contactor, an opening in said diaphragm about the agitator shaft which passes therethrough and which opening is sufficiently larger than the shaft to permit the passage of a substantial amount of liquid therethrough, an agitator attached to the shaft between said diaphragm and the bottom diaphragm of said bottom section, in the horizontal plane of the agitator an opening at the mating edges of said tube in the bottom cover and the lower tube of said bottom section to permit liquid flowing outward from the agitator to pass from within the tubes to that area within the shell which surrounds the tubes, with a liquid inlet and outlet for the contactor through said bottom cover, one of which connects with the interior of said tube fastened to said bottom cover and the other of which connects with the space within the shell surrounding the last mentioned tube.

7. The contactor of claim 4 in which there is an opening in the trap door in at least one of said tubes, and a recycle pipe, communicating said opening with the opening in the diaphragm across said one tube.

8. In a contactor for mixing two liquids, provided with an inner mixing chamber surrounded by a settling chamber, the inner chamber being divided into upper and lower sections, a wall separating the chambers with an opening in it between said sections that connects the chambers, and within the wall and between said sections and substantially on a level with said opening a centrifugal agitator with vertical radial blades and two annular shrouds mounted on the tops and bottoms of the blades which provide openings to the interior of the agitator, and means for supplying the liquids adjacent the respective openings in the shroud to the interior of the agitator.

References Cited
UNITED STATES PATENTS

| | | | |
|---|---|---|---|
| 2,063,789 | 12/1936 | Burk | 23—270.5 |
| 2,665,196 | 1/1954 | Poffenberger | 259—8 X |
| 2,847,283 | 8/1958 | Figg | 23—270.5 |
| 2,963,281 | 12/1960 | Reiffen | 259—96 XR |

WALTER A. SCHEEL, *Primary Examiner.*

J. M. BELL, *Assistant Examiner.*